INVENTORS:
PAUL O. H. LANGE
PAUL REGUL
BY Michael S. Striker
their ATTORNEY

INVENTORS
PAUL O.H. LANGE
PAUL REGUL
BY
Michael S. Striker
their ATTORNEY

June 1, 1965 P. O. H. LANGE ETAL 3,186,062
SINGLE-SPINDLE CHUCKING AUTOMATIC
Filed Oct. 26, 1961 12 Sheets-Sheet 6

INVENTORS
PAUL O. H. LANGE
PAUL REGUL

BY Michael S. Striker their ATTORNEY

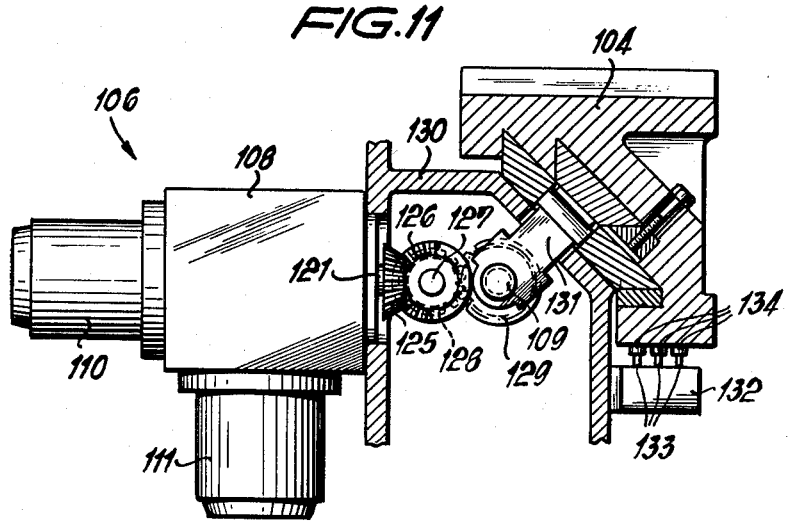
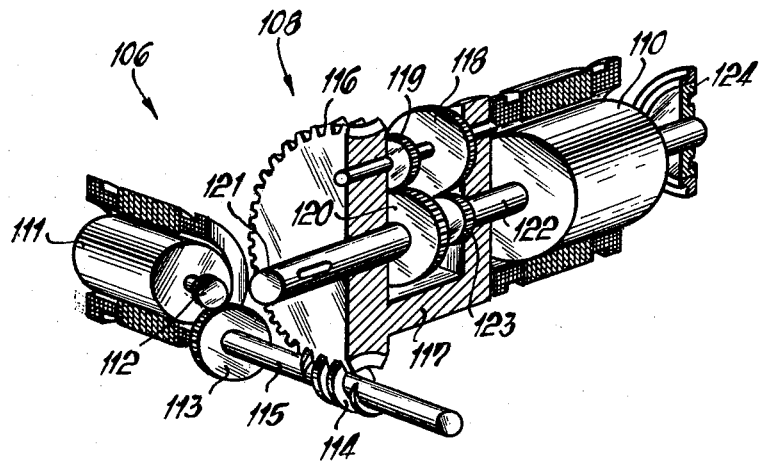

June 1, 1965  P. O. H. LANGE ETAL  3,186,062
SINGLE-SPINDLE CHUCKING AUTOMATIC
Filed Oct. 26, 1961  12 Sheets-Sheet 11
FIG. 12c
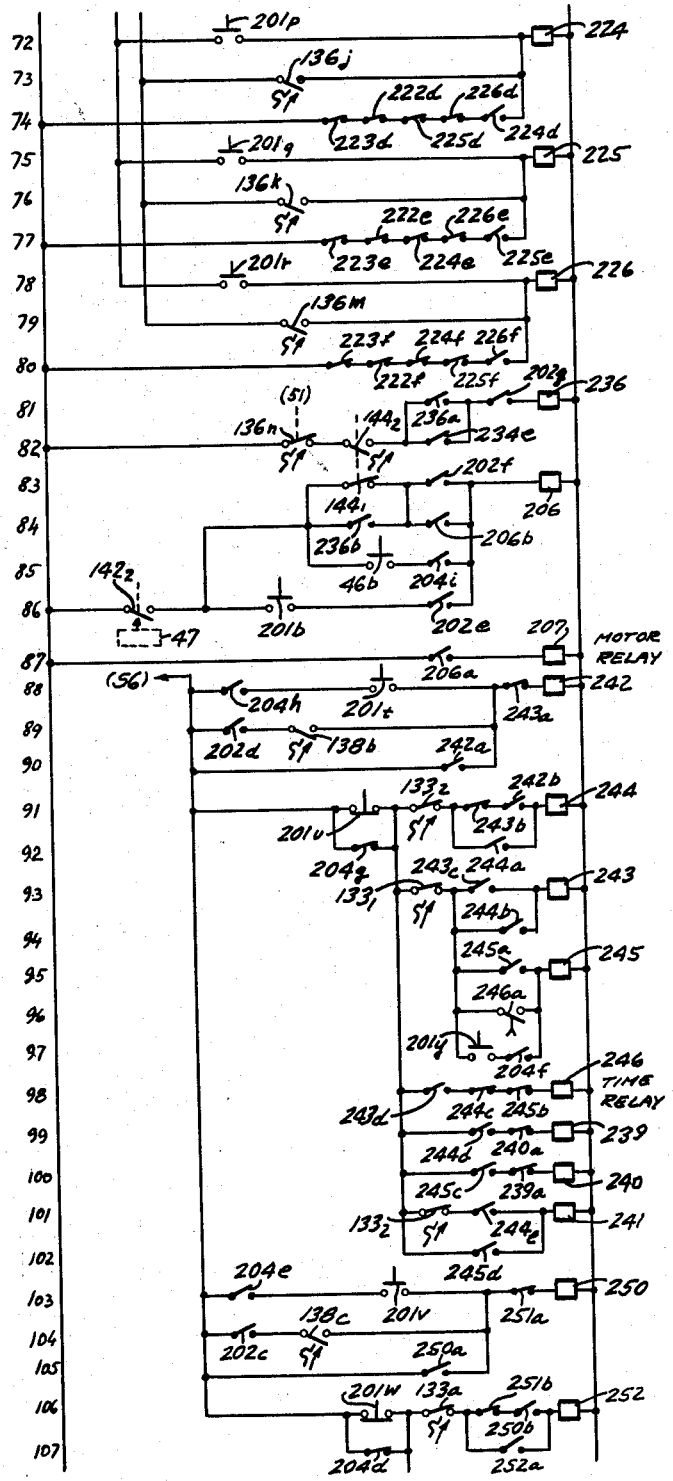
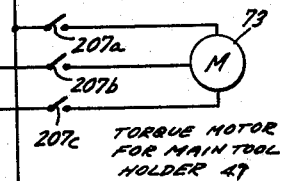
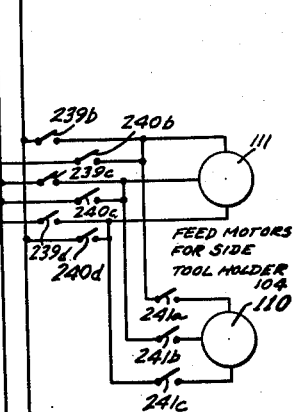
INVENTORS
Paul O. H. Lange
Paul Regel
BY
Michael S. Striker
Attorney

United States Patent Office 3,186,062
Patented June 1, 1965

3,186,062
SINGLE-SPINDLE CHUCKING AUTOMATIC
Paul O. H. Lange and Paul Regul, Bielefeld, Germany, assignors to Werkzeugmaschinenfabrik Gildemeister & Comp., Akt.-Ges., Bielefeld, Germany
Filed Oct. 26, 1961, Ser. No. 147,965
Claims priority, application Germany, July 14, 1959, W 26,002; July 18, 1959, W 26,041
8 Claims. (Cl. 29—38)

This application is a continuation-in-part of our application, Serial No. 42,615, filed July 13, 1960, now abandoned.

The present invention relates to machine tools in general, and more particularly to an automatic multiple-purpose machine tool known as single-spindle chucking automatic. Still more particularly, the invention relates to a single-spindle chucking automatic of the type comprising a rotary multi-face main tool block or holder which is movable longitudinally of the machine, and at least one side slide or holder which is movable in directions transverse to and eventually also in parallelism with the longitudinal direction of the machine. As is known, each face of the main tool holder and each side tool holder may support one or more tools which are brought into contact with a workpiece in a predetermined sequence.

Known machine tools of this general character are classified in two main groups the one of which utilizes cams and the other of which may be rapidly adjusted for the production of different articles purely by hydraulic means. The disadvantage of known cam-controlled machines is that a new cam or a new set of cams must be precision-finished for each type of product, or that the automatic must be provided with adjustable cams, or that the automatic must embody complicated and very expensive control arrangements which enable an operator to utilize the same set of cams for different operations.

The more recent hydraulically controlled automatics may be adjusted for the production of different articles within very short periods of time, and such machines are generally considered as a definite improvement over the electromechanically operated automatics. However, the maintenance of a hydraulically controlled automatic is much more complicated and can normally be performed only by highly skilled specialists, whereas a cam-controlled automatic may be readily serviced by any skilled mechanic. This is due to the fact that the operation of a hydraulically controlled machine cannot be followed with such facility as the operation of an electromechanically controlled machine. In addition, a hydraulically controlled machine is more sensitive because its operation varies in response to temperature changes which can bring about undesirable variations in the rate of feed of the workpiece and/or of the tools. Moreover, since any medium sized or even small machine shop or plant will employ one or more skilled mechanics but will not necessarily employ a highly skilled person specializing in the maintenance of complicated hydraulic apparatus, there exists an urgent need for electromechanically controlled automatics whose performance is superior to, equals or at least approaches the performance of hydraulically controlled automatic machine tools.

An important object of the present invention is to provide an improved one-spindle chucking automatic which may be conveniently and rapidly adjusted for the production of differently shaped and/or dimensioned articles.

Another object of the invention is to provide an automatic of the above outlined characteristics which is adapted to carry a large number of special-purpose tools so that it may perform operations, such as multi-hole drilling, milling, internal recessing, and others, which otherwise would have to be performed by two or more machine tools.

A further object of the invention is to provide a one-spindle chucking automatic whose basic construction may remain unchanged even if it should become necessary to convert one model into another as a result of major changes in the production program.

An additional object of the invention is to provide a single-spindle chucking automatic which is equally suited for the machining of straight or complicated parts, and which may be utilized with great advantage in plants where the production requirements are too high for an operation with turret lathes but too low to justify the expenditures involved in the procurement and maintenance of multi-spindle automatics.

A concomitant object of the instant invention is to provide a machine tool of the above outlined type which will hold close tolerances for long production runs and which, therefore, is suited for finish-turning operations and may be employed for machining work of the type normally performed by turret lathes.

Still another object of the invention is to provide a single-spindle chucking automatic which utilizes a camless control system so that it may be rapidly re-set to handle different work, which is of rigid and sturdy construction to minimize vibration, whose operating speeds (empty run or feed) may be adapted to the requirements in connection with the use of modern cutting tools and engineering materials, which may be readily combined with a number of auxiliary attachments for the production of special parts and for facilitating the delivery of workpieces and/or discharge of finished parts, which utilizes simple controls so that it may be readily operated by semiskilled personnel, which is constructed in such a way as to facilitate removal of cuttings, chips and shavings accumulating when the machine is in actual use, and which may be readily integrated with other machines in transfer lines by means of suitable automatic work feeding and pick-up attachments.

A more specific object of the invention is to provide a single-spindle chucking automatic whose main tool holder may be mounted and adjusted in such a way that it must cover a comparatively short distance in order to reach a position in which another of its faces can be turned into operative position.

Another more specific object of the invention is to provide a machine tool of the above outlined characteristics whose main tool holder is maintained in such position that it cannot obstruct chip clearance.

With the above objects in view, the invention resides in the provision of a single-spindle chucking automatic comprising a multi-face main tool holder which is combined with drive means for angularly displacing and for axially reciprocating the same, at least one side tool holder which is supported by the machine frame for movements at least transversely to the axis of the main tool holder, an electro-mechanical drive for reciprocating the side tool holder, and a control system for the tool holders, this control system comprising at least one control drum which is operatively connected with the main tool holder in such a way that it participates at least in angular displacements of the main tool holder, a plurality of actuating elements in the form of trips which are adjustably supported by the control drum, and suitable switch means mounted in the path of the trips and connected in the circuit of the electro-mechanical drive as well as in the circuit of at least that drive means which brings about axial movements of the main tool holder. In one of its preferred forms, the automatic of our invention comprises a main tool holder which is formed with five tool-supporting faces and is mounted on a shaft which is parallel with a control rod provided with three control drums. The control rod is mounted in a crosshead of the machine frame above the shaft which supports the multi-face tool holder, and the latter is mounted above the main spindle and the work supporting chuck which is carried by the spindle, so that an operator will have access to all parts of the machine for evacuation of all chips, shavings and other fragments which are removed from the workpiece during a milling, drilling, planing, turning, flanging and/or other operation.

It has been found that an electromechanically operated automatic requires less maintenance and less repair work than a hydraulically controlled machine. An important feature of the improved automatic is that its feed is not affected by temperature changes and that its maintenance is much cheaper than the upkeep of hydraulic automatics.

In another of its preferred forms, the automatic comprises an electromechanical drive for axially reciprocating the main tool holder, and the control drums embody additional actuating elements or trips which may actuate suitable switches in the circuits of the electric motors forming part of the electromechanical axial drive for the main tool holder. The angular movements of the main tool holder may be brought about by a torque motor which operates a Geneva transmission adapted to rock the shaft of the main tool holder through a system of suitable reducing gears.

Another feature of the invention resides in the provision of an adjustable indexing guide which cooperates with an index plate connected to the main tool holder so that the latter must cover a short distance to reach position in which the index plate is disconnected from the indexing guide in order that the main tool holder may change its angular position.

The novel features which are considered as characteristic of the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

FIG. 10 is a somewhat schematic partly sectional perspective view of certain components forming part of a feed unit for one of the side tool holders;

FIG. 11 is a partly elevational and partly sectional view of the feed unit which is shown mounted on the carrier of the front side tool holder;

FIGS. 12a, 12b, 12c, 12d taken together are a circuit diagram illustrating in greater detail the circuit components of the entire arrangement which are shown only schematically in FIG. 12.

Figure 1:
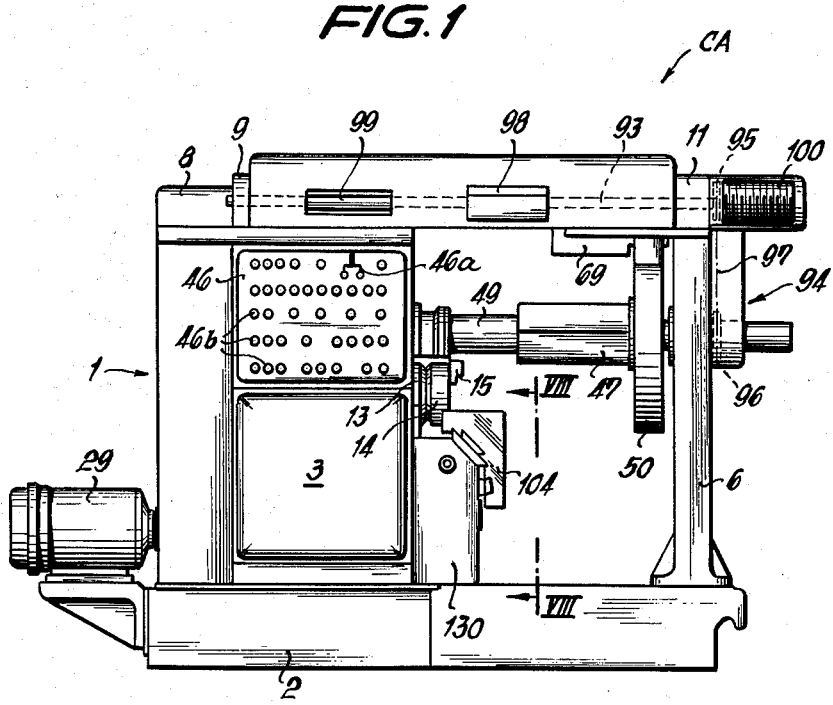
FIG. 1 is a side elevational view of the improved single-spindle chucking automatic.

Referring now in greater detail to the illustrated embodiment, and first to FIGS. 1 and 2, there is shown a single-spindle chucking automatic CA which comprises a frame 1, preferably of the portal type, including a base or bed 2, a spindle housing 3 forming part of the frame 1 and containing bearings 4, 5 (FIG. 2) and certain other bearings which will be described hereinafter, an upright or column 6 which supports a bearing 7, and a crosshead 8, which supports bearings 9, 10 and 11.

Figure 2:
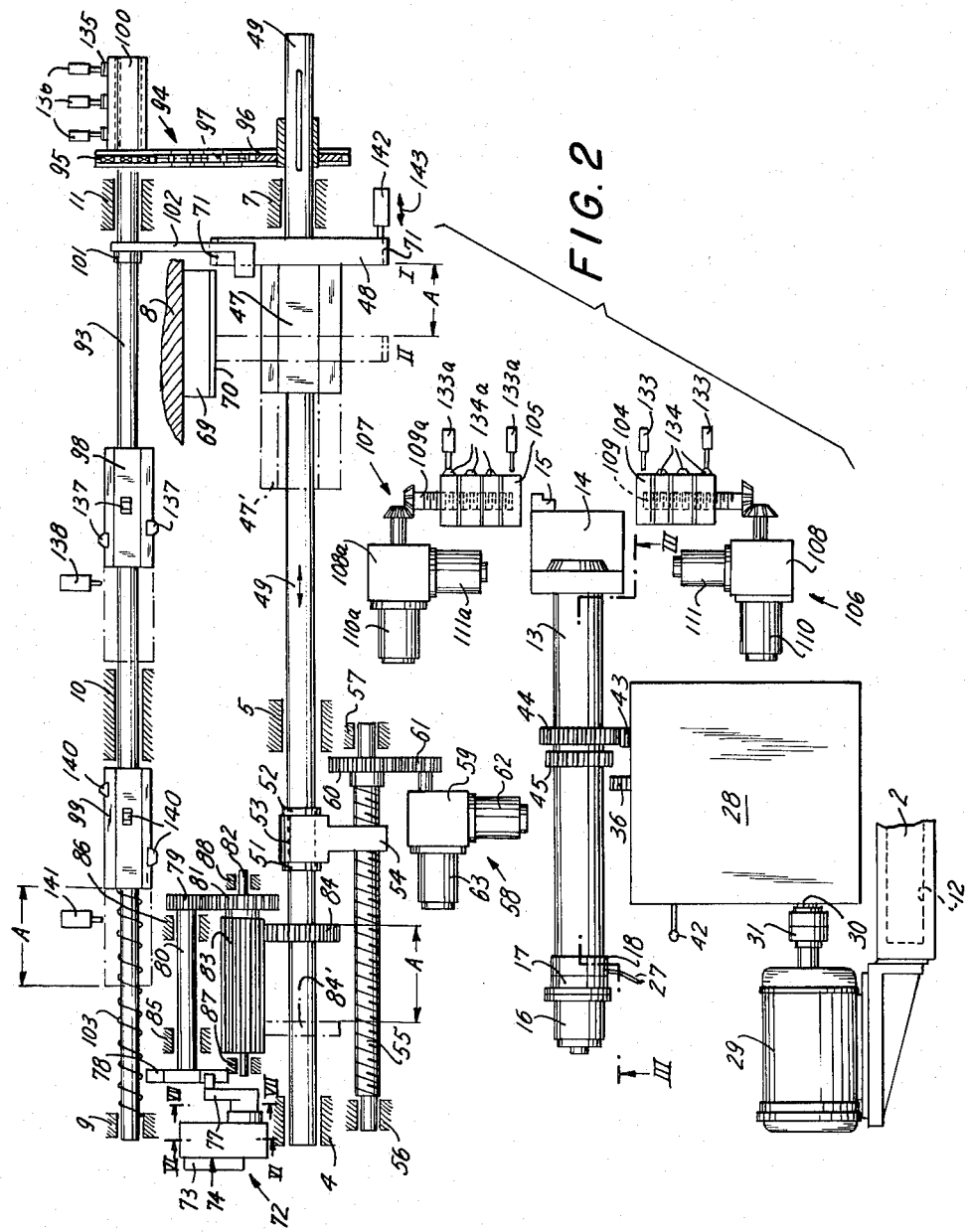
FIG. 2 is a diagrammatic exploded view of the chucking automatic with the frame omitted and with both side tool holders moved from a horizontal into a vertical plane.

In FIG. 2, the entire frame 1 has been omitted for the sake of clarity so as to expose all important components of the automatic. The bed 2 preferably constitutes a tank by defining a compartment 12 which holds a large quantity of coolant.

A hollow main spindle 13 is mounted in horizontal position and is rotatably supported in suitable precision bearings provided in the spindle housing 3. The forward, i.e. right-hand end of the main spindle 13, as viewed in FIGS. 1, 2 and 3, carries a suitable chuck 14 which is adapted to support a non-illustrated workpiece, e.g. a gear, a flange, a hub, a V-belt pulley or any other blank which can, for example, be machined in a turret lathe or another machine tool. The improved chucking automatic may be adapted for the machining of cast, hot-pressed or drop-stamped parts, such as automotive components, fittings and the like. The chuck 14 may be actuated by suitable electromechanical, hydraulic or pneumatic means, and the control gear of the chuck may be automatic or hand-lever operated.

Figure 3:
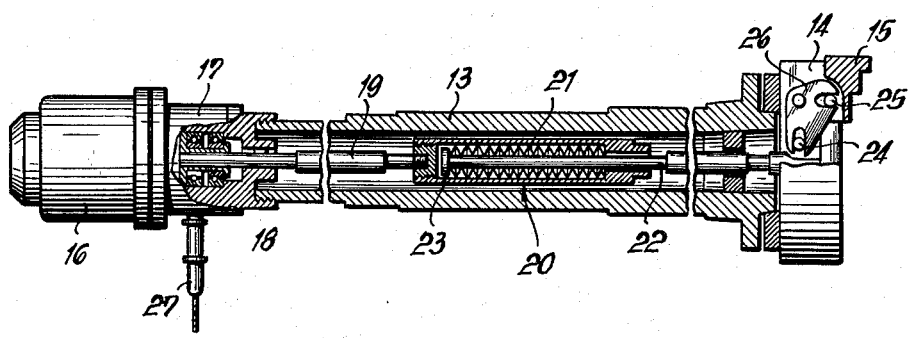
FIG. 3 is an axial section through the hollow main spindle of the chucking automatic, showing an electromechanical actuating arrangement for the work-engaging jaws of the chuck, the section of FIG. 3 being taken in the direction of arrows as seen from the line III—III of FIG. 2.

An electromechanical actuating arrangement for the jaws 15 of the chuck 14 is shown in FIG. 3. At the rear end of the spindle 13, there is provided an electric motor 16 which is drivingly connected with a planetary gearing arranged in a casing 17 which includes an internally threaded nut-like reciprocating member 18 and which is mounted to the externally threaded rear end portion of the main spindle. The reciprocating member 18 is rotatably secured to a push-pull rod 19 which extends into the interior of the main spindle and is connected at its forward end with a coupling 20 including a package of dished springs 21. The springs 21 are mounted on and engage an annular flange 23 provided at the rear end of a second push-pull rod 22 whose forward end extends to the chuck 14 and carries a series of radial motion transmitting pins 24, one for each jaw 15 of the chuck. Each jaw 15 is provided with a similar motion transmitting pin 25. The illustrated pin 24 of the rod 22 and the pin 25 of the illustrated jaw 15 extend into open slots provided in the arms of a bell crank lever 26 which is pivoted to the chuck 14. When the reciprocating member 18 rotates in one direction, it causes the rods 19, 22 to move in a direction to the right, as viewed in FIG. 3, whereby the lever 26 causes the jaw 15 to move outwardly and away from the axis of the chuck 14 to release a workpiece. If the member 18 rotates in the opposite direction, the rods 19, 22 pivot the lever 26 in clockwise direction, as viewed in FIG. 3, so that the jaw 15 moves inwardly and engages the workpiece.

A cable 27 connects the motor 16 with a suitable source of electrical energy. The purpose of the dished springs 21 in the coupling 20 is to equalize the stresses and to resiliently maintain the jaw 15 in engagement with the work. The motor 16 is of the reversible type so that it can rotate the reciprocating member 18 in clockwise or anticlockwise direction.

The main spindle 13 is driven by a variable-speed transmission 28 which, in turn, is driven by a two-stage main motor 29, preferably of the pole-changing type, the latter mounted on the base 2 and preferably located externally of the spindle housing 3.

Figures 4, 5:
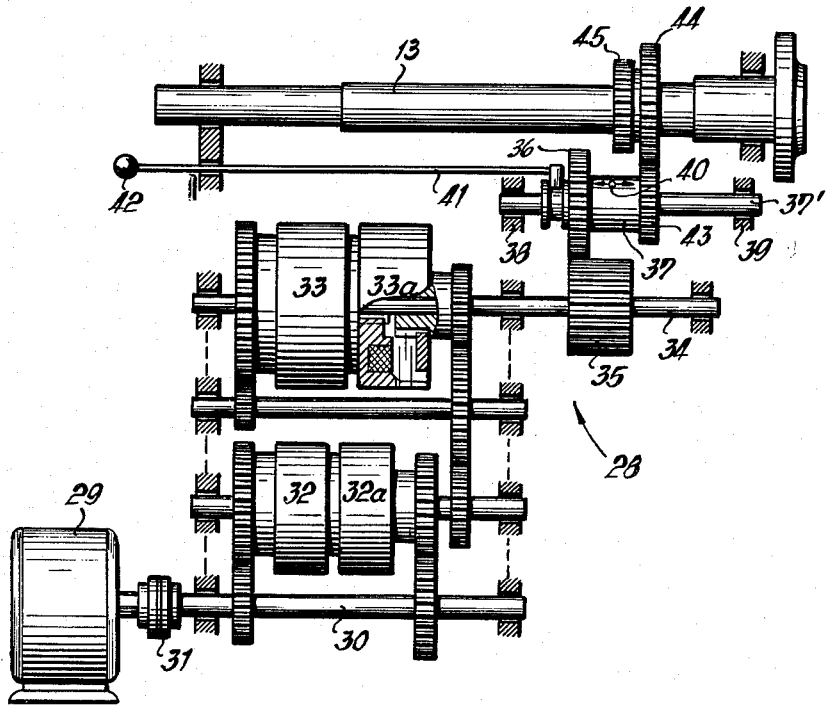
FIG. 4 is an enlarged section through the housing of the transmission which drives the main spindle.
FIG. 5 is a diagram illustrating two ranges of r.p.m. at which the main spindle may be driven by the transmission of FIG. 4.

The transmission 28 is shown in greater detail in FIG. 4. Its input shaft 30 is driven by the motor 29 through a clutch 31. The shaft 30 drives a pair of electromagnetic twin clutches 32, 32a and 33, 33a the latter of which drives an output shaft 34 provided with a spur gear 35 of substantial axial length. The gear 35 is in permanent mesh with a gear 36 of slidable cluster gear 37 shiftably supported on intermediate shaft 37' which is supported in bearings 38, 39 of the transmission housing, the cluster gear 37 may be reciprocated in directions indicated by the double-headed arrow 40 with the help of a push rod 41 provided with a handgrip member 42. The cluster gear 37 also includes a gear 43 which is movable into and out of mesh with a spur gear 44 on the main spindle 13. A second spur gear 45 on the main spindle 13 is adapted to mesh with the gear 36 when the intermediate shaft 37 is moved to the right, as viewed in FIG. 4, so as to move the gear 43 away from the gear 44. Thus, the operator may change the range of speed rates at which the spindle 13 is driven by moving the shaft 37 with its gears 36, 43 from the end position shown in FIG. 4 to the other end position in which the gear 36 meshes with the gear 45. The transmission 28 and the main motor 29 may drive the spindle 13 at eight different speeds in each end position of the intermediate shaft 37. This is shown schematically in FIG. 5. For example, when the shaft 37 assumes the position of FIG. 4, the spindle 13 may be driven at eight speeds ranging from 28–700 r.p.m. If the gear 36 is moved into mesh with the gear 45, the main spindle may be driven at eight different speeds between 56–1400 r.p.m. As a rule, the two-stage motor 29 and the twin clutches 32, 32a and 33, 33a are operated by electric control means in a fully automatic way. Alternately, the chucking automatic may be provided with manual controls in the form of pushbuttoms on a switchboard 46 shown in FIG. 1.

The chucking automatic further comprises a multi-face main tool holder 47, best shown in FIG. 1, which is connected with an index plate 48 (FIG. 2) and is axially movable with a horizontal shaft 49, the latter parallel with the main spindle 13 and mounted in the bearings 4, 5 of the spindle housing 3, as well as in the bearing 7 of the column 6. The index plate 48 is enclosed in a casing 50 which is shown in FIG. 1. The shaft 49 is shiftable in the axial direction of and is free to rotate in the bearings 4, 5 and 7. Within the spindle housing 3, i.e. between the bearings 4 and 5 (see FIG. 2), the shaft 49 carries two guide rings or stops 51, 52 whose purpose is to prevent axial displacements of a sleeve 53 along the shaft 49. The sleeve 53 is rotatably mounted on the shaft 49 between the rings 51, 52 and is connected to or is integral with a spindle nut 54. The internal threads of the nut 54 mate with external threads on a threaded shifting spindle 55 which is parallel with the main spindle 13 and is rotatably mounted in two spaced bearings 56, 57 of the spindle housing 3. This shifting spindle 55 is rotatable by an electromechanical driving arrangement or drive 58 including a transmission 59 and two reducing gears 60, 61. The gear 60 is coaxially mounted on the spindle 55 and meshes with the gear 61 which latter is driven by the output shaft of the transmission 59. The driving arrangement 58 for the shifting spindle 55 further comprises a variable-speed D.-C. feed motor 62 and a high-speed polyphase induction motor 63. The construction of the transmission 59 corresponds to that of the transmission 108 shown in FIGS. 10 and 11.

The driving arrangement 58 can cause the shaft 49 to perform an axial stroke whose maximum length equals the distance A indicated in FIG. 2 beneath the main tool holder 47. The shaft 49 will thereby displace the tool holder 47 and the index plate 48 so that, by utilizing a system of potentiometer controllers 65–68 (FIG. 12), one for each face of the tool holder 47, the latter may be set up for a desired feed regardless of which of its five faces is turned to an operative position with respect to a workpiece held in the jaws of the chuck 14. Alternatively, the longitudinal motion of the main tool holder 47 may be derived from the main spindle 13, e.g. through a transmission similar to the transmission 28 shown in FIG. 4. In such instances, the driving arrangement 58 may be dispensed with.

Figure 6:
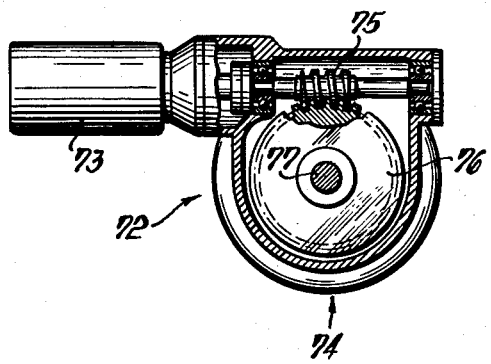
FIG. 6 is a partly rear elevational and partly sectional view of an electromechanical driving arrangement which rotates the main tool holder, the section of FIG. 6 being taken along the line VI—VI of FIG. 2, as seen in the direction of arrows.

The diameter of the index plate 48 exceeds considerably the transverse dimensions of the main tool holder 47, and this index plate is adapted to cooperate with an indexing guide 69 which is secured to the crosshead 8. The indexing guide 69 is formed with longitudinally extending retaining means in the form of a tooth 70 which may be received in a selected one of several peripheral notches 71 provided in the index plate 48. The tooth 70 is parallel with the axis of the shaft 49. The indexing guide 69 may be secured to the crosshead 8 in a number of different positions. When engaging with the index plate 48, the indexing guide 69 will hold the main tool holder 47 against rotation with the shaft 49. When the index plate 48 assumes the full-line position indicated by the reference character I, it is disengaged from and may be rotated with respect to the indexing guide 69 in order to move another face of the main tool holder 47 into operative position. Such angular displacements of the shaft 49, together with the main tool holder 47 and with the index plate 48, are brought about by another electromechanical driving arrangement or drive 72 (shown in FIGS. 2, 6 and 7) which comprises a torque motor 73 drivingly connected with the worm 75 of a worm drive 74, the latter further including a worm wheel 76 mounted on a crank shaft 77. This crank shaft and a Maltese cross-shaped member 78 together form a Geneva transmission which rotates the shaft 49 through a system of reducing gears including a first gear 79 mounted on the shaft 80 of the member 78, a second gear 81 which is mounted on a shaft 82 and meshes with the gear 79, an elongated third gear 83 which is coaxially connected with the shaft 82 and meshes with a fourth gear 84 which is coaxially mounted on and rotates with the shaft 49. The shafts 80, 82 are respectively mounted in bearings 85, 86 and 87, 88 provided in the housing 3 of the main spindle 13. The transmission ratio of the gears 79, 81, 83, 84 is selected in such a way that each step performed by the member 78 (i.e. each angular displacement of the member 78 through 90 degrees) will turn the shaft 49 through one-fifth of a complete revolution, i.e. through 72 degrees, because the main tool holder 47 is assumed to have five faces. As shown in FIG. 2, the axial length of the gear 83 exceeds the length of the maximum axial stroke A of the tool holder 47 and of its shaft 49 so that the gears 83, 84 will remain in mesh in each axial position of the main tool holder. When the main tool holder assumes its phantom-line position 47', the gear 84 assumes the phantom-line position 84'.

Figure 7:
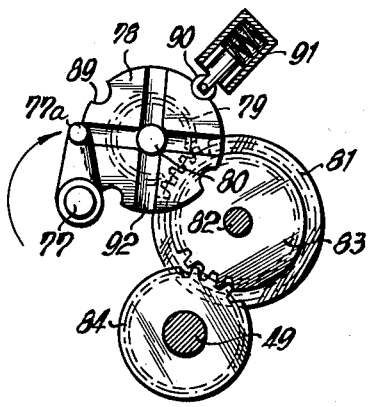
FIG. 7 is an enlarged detail view of a Geneva transmission which cooperates with the driving arrangement shown in FIG. 6, the view of FIG. 7 being taken in the direction of arrows as seen from the line VII—VII of FIG. 2.

As shown in FIG. 7, the periphery of the member 78 is formed with four recesses 89 one of which will receive a spherical retaining element 90 whenever the member 78 is brought to a halt. The retaining element 90 is under the bias of a helical spring 91. The member 78 is provided with radially extending motion transmitting elements 92 one of which is engaged by the pin 77a of the crank shaft 77 when the latter is rocked by the worm drive 74.

It will be readily understood that, since the indexing guide 69 is adjustably secured to the crosshead 8, it may be moved into such position that the shaft 49 must perform only a comparatively short axial stroke in order to move the index plate 48 into the position I in which the shaft 49 may be angularly displaced by the drive 72. Such adjustments in the position of the indexing guide 69 will be made in dependency on the length of a workpiece and after each setting of the machine for a given operation. When the workpiece is short, the starting position I of the index plate 48 is closer to the chuck 14. The illustrated position I corresponds to that which the index plate 48 assumes when the workpiece is comparatively long, i.e. when the index plate must be shifted substantially all the way to the column 6.

The index plate 48 is enclosed in the casing 50 to prevent eventual accidents and to protect the index plate from chips, shavings or other foreign matter.

The crosshead 8 supports a horizontal control rod 93 (FIGS. 1 and 2) which is mounted in the bearings 9, 10, 11 in parallelism with and above the shaft 49. The mounting of the control rod 93 is such that it may be rotated in its bearings and that it may also perform limited axial movements for the purpose to be described hereinafter. The means for rotating the control rod 93 comprises a chain drive 94 including a sprocket 95 on the control rod 93, a sprocket 96 on the shaft 49, and an endless chain 97.

The control rod 93 carries three spaced control drums 98, 99 and 100. The drums 98, 99 are rigidly connected to the control rod 93, and the third or right-hand drum 100 is mounted in such a way that it participates in rotary but not in axial displacements of the control rod. The sprocket 95 is connected with the control drum 100 so that the rod 93 and the drums 98–100 must share all angular movements of the shaft 49 and of the main tool holder 47.

The control rod 93 carries a ring 101 which abuts against a motion transmitting element in the form of an arm 102, the latter's free lower end extending into the path of the index plate 48 and being permanently biased into engagement with the left-hand side of the index plate 48 by a resilient element in the form of a helical spring 103 which is mounted on the control rod 93 and operates between the fixed bearing 9 and the left-hand control drum 99. The arm 102 is freely rotatable on the control rod 93. The spring 103 tends to axially displace the control rod 93 in a direction to the right, as viewed in FIG. 2, and, together with the ring 101 and with the motion transmitting element 102, insures that the control rod 93 participates in all axial displacements of the shaft 49.

Figure 8:
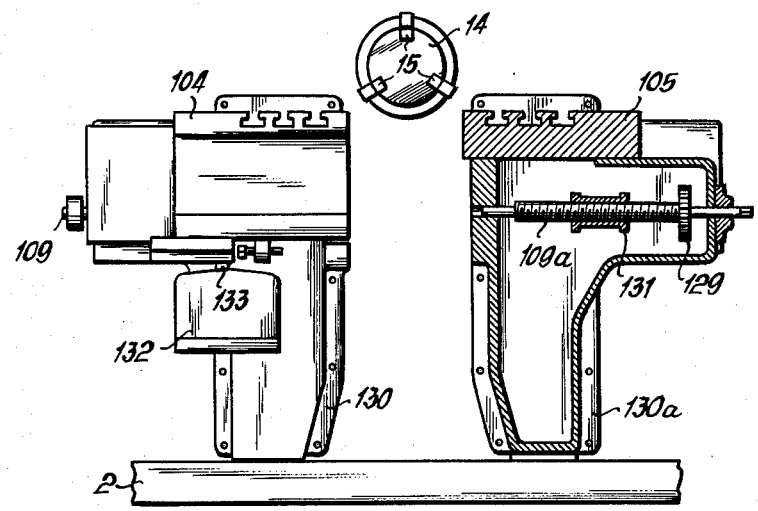
FIG. 8 is an enlarged view of two side tool holders one of which is shown in front elevation and the other of which is shown in transverse section, the view of FIG. 8 being taken in the direction of arrows from the line VIII—VIII of FIG. 1.
Figure 9:
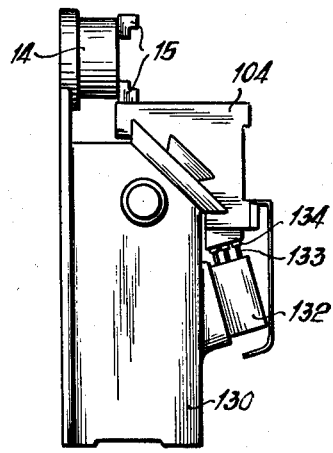
FIG. 9 is an enlarged side elevational view of the left-hand tool holder shown in FIG. 8.

The chucking automatic further comprises two side tool holders 104 and 105 which are shown in FIGS. 2 and 8. The tool supporting upper faces of these holders are located in a horizontal plane and normally slightly below the level of the main spindle 13, whereas the control rod 93 is located above the shaft 49 which latter, in turn, is located above the main spindle 13. The left-hand or front side holder 104 (see also FIGS. 1 and 9) is operated by an electromechanical driving arrangement or feed unit 106, and a similar driving arrangement or feed unit 107 operates the right-hand or rear side tool holder 105. The feed unit 106 comprises a variable-speed transmission 108, a driving spindle 109 which is operatively connected with the tool holder 104, a high-speed electric motor 110, and a feed motor 111. The feed unit 107 comprises a high-speed motor 110a, a feed motor 111a, a variable-speed transmission 108a and a driving spindle 109a connected to the tool holder 105. The motors 110, 111, 110a, 111a are polyphase induction motors.

In its preferred form, the improved chucking automatic comprises at least one side tool holder. The rear holder 105 may be furnished optionally as a compound holder and is preferably adapted to perform movements longitudinally as well as transversely of the main spindle. In addition, such a compound side tool holder may be equipped with a copying attachment, if desired.

For greater convenience in loading and unloading of bulky workpieces, the tool holder 104 is preferably mounted in such a way that it may be turned through about 15 degrees.

FIGS. 10 and 11 illustrate in greater detail the driving arrangement or feed unit 106 for the tool holder 104. Referring first to FIG. 10, the feed motor 111 drives a system of reducing gears 112, 113, the latter mounted on the shaft 115 of a worm 114. This worm meshes with a worm wheel 116 which is formed with an extension 117 defining a housing for a system of planet gears 118, 119, 120. The planet gear 120 is mounted on the output shaft 121 which is coaxial with the shaft 122 of the high-speed motor 110, and the shaft 122 carries the driving gear 123. The parts 112–121 together constitute the transmission 108 of the feed unit 106.

The driving gear 123 of the high-speed motor 110 meshes with the planet gear 118. When the feed motor 111 is arrested, the worm wheel 116 and the planet gears 118–120 are maintained in their positions by the self-locking worm 114. The high-speed motor 110 then drives the output shaft 121 of the transmission 108 through the gear 123 which rotates the planet gears 118, 119, 120 in that order, i.e. the planet gears 118–120 then serve as reducing gears.

When the high-speed motor 110 is arrested and the feed motor 111 is started, the worm wheel 116 rotates and entrains the planet gears 118–120. The high-speed motor 110 is equipped with a magnetic brake 124 which exerts a given braking force on the driving gear 123. Thus, the brake 124 holds the gear 123 against rotation while the worm wheel 116 rotates so that the planet gear 118 rolls along the stationary gear 123 and thereby controls the speed at which the mating planet gears 119, 120 can rotate the output shaft 121. This accounts for a slower rotation of the output shaft 121 when driven by the feed motor 111.

Referring now to FIG. 11, the output shaft 121 carries a bevel gear 125 whose teeth mesh with the teeth of a second bevel gear 126 mounted on an intermediate shaft 127, the latter also carrying a spur gear 128 which meshes with a spur gear 129 mounted on the threaded spindle 109 of the tool holder 104. The spindle 109 is rotatably mounted in a bracket or carriage 130, and its threads mesh with the internal threads of a spindle nut 131 which is anchored in the tool holder 104. The bracket 130 also supports the transmission 108 and the motors 110, 111. Furthermore, and as shown in FIG. 11, the bracket 130 carries a switch-box 132 which supports a series of switches 133 engageable by adjustable trips 134 mounted on the tool holder 104.

The feed unit for the rear tool holder 105 is preferably of identical design.

The high-speed electric motor 63 of the drive 58 is utilized for rapidly moving the main tool holder 47 to an operative position with respect to the workpiece which is held by the jaws 15 of the chuck 14, and for rapidly returning the tool holder 47 to a position corresponding to the position I of the index plate 48 in which another face of the main tool holder may be turned into an operative position by the drive 72. When the index plate 48 assumes its phantom-line position II, it is properly engaged by the indexing guide 69. The main tool holder 47, in its phantom-line position 47', is then ready to move a tool into actual contact with the workpiece under the action of the feed motor 62.

The drum 100 supports several actuating elements or trips 135 which are adjustable in the longitudinal direction thereof. These trips cooperate with complementary actuating elements in the form of switches 136 which are connected in the electric circuit of the potentiometer controllers 64–68, of the transmission 28, and of the main motor 29, see FIG. 12. The movements of the main tool holder 47 during actual engagement of a tool thereon with a workpiece are controlled by the feed motor 62 of the drive 58 which is started by longitudinally adjustable trips or actuating elements 137 on the median control drum 98, these trips engaging with suitably positioned switches 138 connected in the electric circuit of the motor 62, of the potentiometer controllers 64–68, of the switches 133, and of the switches 133a which latter cooperate with adjustable trips 134a mounted on the tool holder 105, the switches 133a are mounted on the bracket or carriage 130a (FIG. 8) for the spindle 109a of the tool holder 105. The feed motor 62 thereupon drives the transmission 59 and axially moves the main tool holder 47 at a predetermined speed, i.e. at the speed determined by one of the potentiometer controllers 64–68 for the selected face of the main tool holder. Since the motor 62 is of the variable-speed type, a desired setting of this motor for a given operation is simultaneously brought about by the trips 135 and switches 136 (see the connection between the potentiometers 64–68 and the motor 62 in FIG. 12).

The drum 100 may assume the form of a cylinder, whereas the drums 98, 99 are preferably formed with as many faces as the main tool holder 47, e.g. with five faces.

Figure 12:
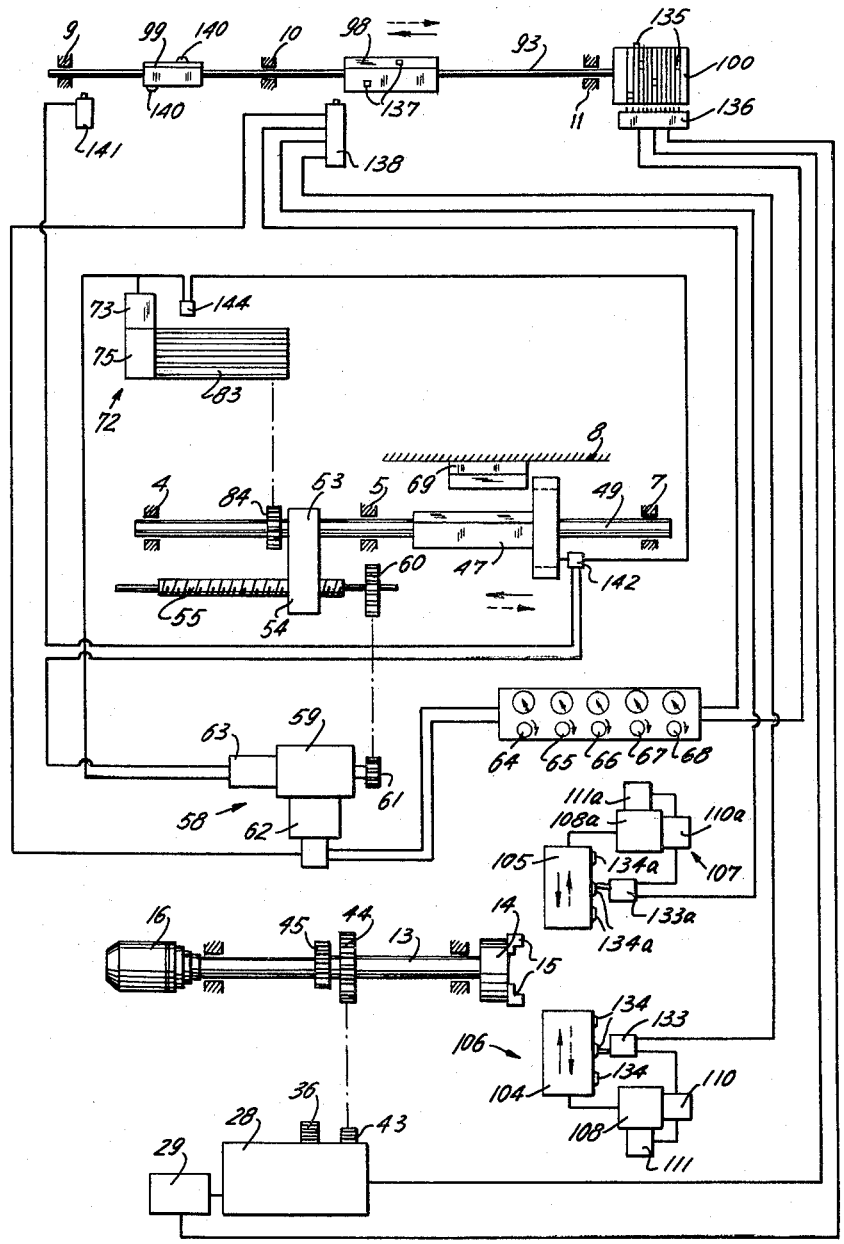
FIG. 12 is a diagram showing the electric circuitry of the chucking automatic.
Figure 12A:
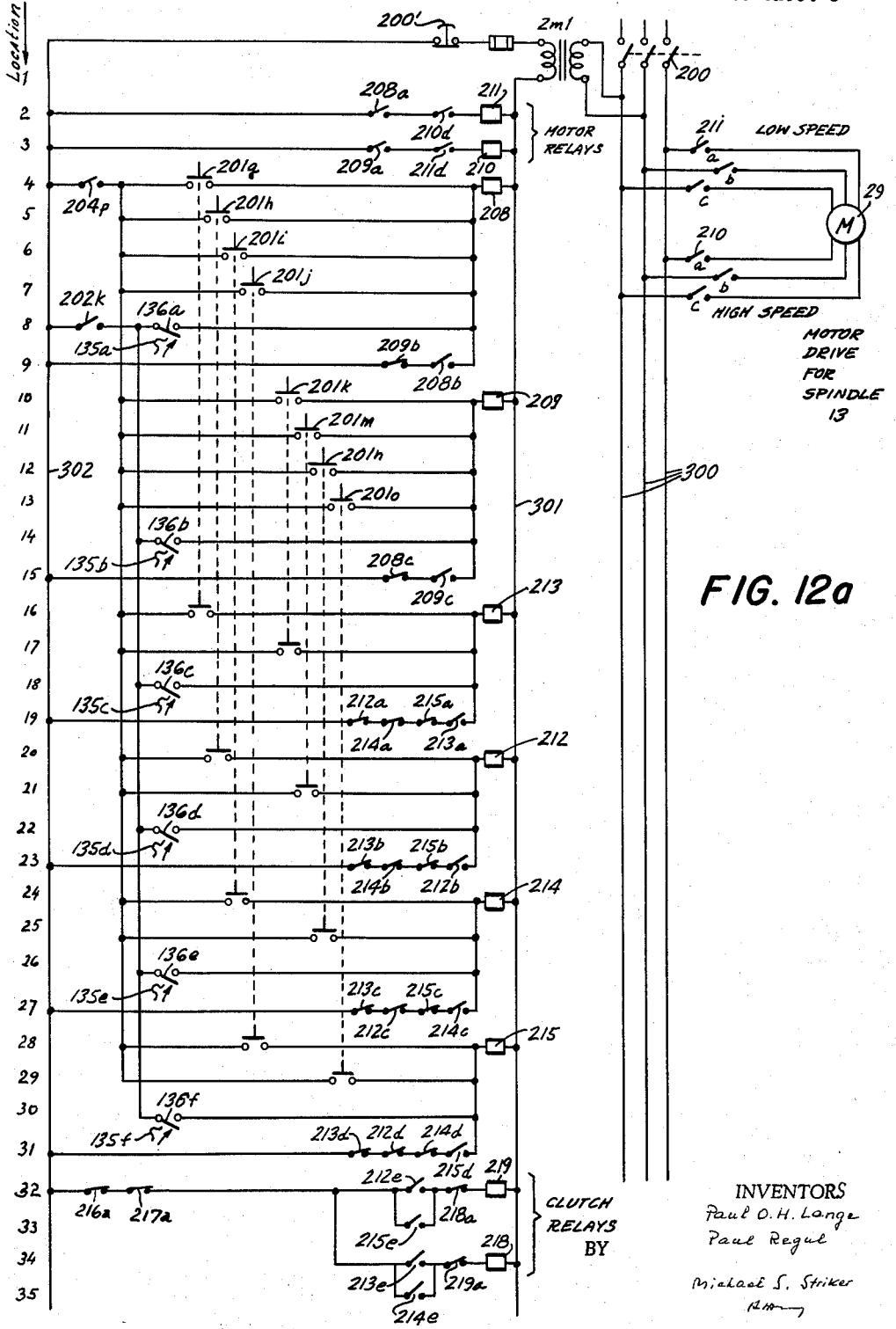
Figure 12B:
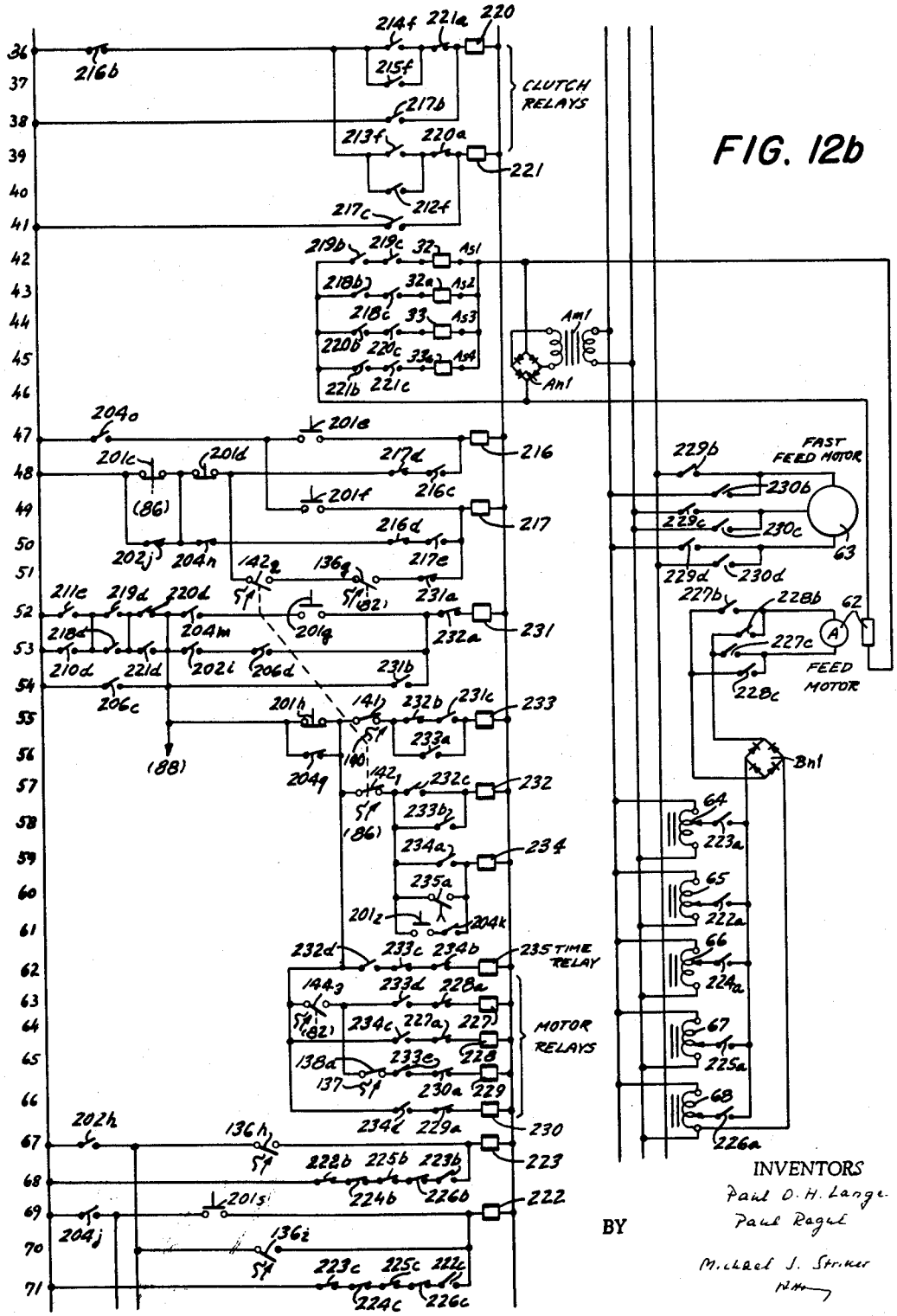

The longitudinally adjustable actuating elements or trips 140 on the left-hand multi-face drum 99, as viewed in FIGS. 2 and 12, are adapted to engage with a switch 141. The switch 141 reverses the axial movement of the shaft 49 by starting the high-speed motor 63 which thereupon returns the main tool holder 47 in a direction to the right, as viewed in FIG. 12, i.e. away from the workpiece. The drive 58 is such that the motor 62 is automatically arrested when the motor 63 is started, or vice versa. Thus, as soon as the motor 63 is started, the motor 62 is arrested in a fully automatic way to terminate the feed movement of the main tool holder 47 so that the latter can be returned by the motor 63 to its full-line position of FIG. 2. When the tool holder 47 reaches such position, the index plate 48 engages with a limit switch 142 which is located to the right of the index plate and is adjustable in the longitudinal direction of the shaft 49 as indicated by the double-headed arrow 143. Such adjustability of the limit switch 142 and of the trips 140 renders it possible to select the end positions of the tool holder 47 in accordance with the axial dimensions of a given workpiece.

The trips 135 on the right-hand control drum and the cooperating switches 136 also select a given speed for the transmission 28 which latter controls the r.p.m. of the main spindle 13 in a manner as described in connection with FIGS. 4 and 5. These trips and switches further select the direction in which the main motor 29 rotates the spindle 13.

As stated hereinabove, the right-hand control drum 100 does not participate in axial movements of the control rod 93 so that the trips 135 are always aligned with the switches 136. Consequently, the switches 136 may be actuated by the trips 135 in each axial position of the control rod 93. For example, the latter may be provided with a key slot or groove which receives an axially parallel key or tongue carried by the drum 100 so that this drum will participate in angular but not in axial movements of the control rod.

The trips 135, 137, 140 on the respective control drums 100, 98, 99 are longitudinally adjustable which, in contrast to the cam-controlled automatics, brings about the advantage that in setting up the improved chucking automatic there is no need to observe whether or not the highest point of the cam lobe is found. Furthermore, the improved chucking automatic renders it unnecessary to set the tools at the various stations of the main tool holder in correct relationship to the first tool to be set so that accurate longitudinal tripping is obtained. Instead, any fine adjustment which might become necessary may be carried out within certain limits by appropriate positioning of the trips.

It will be seen that the trips 140 on the drum 99 control the working stroke of the main tool holder 47 by arresting the feed motor 62 and by simultaneously starting the highspeed motor 63 so as to move the shaft 49 in a direction counter to that in which this shaft was driven by the feed motor 62. The length of the working stroke performed by the main tool holder 47 thus depends on the momentary axial position of the trips 140 on the drum 99. The trips 137 on the median drum 98 control the change-over from rapid axial movement of the main tool holder 47 under the action of the reversible high-speed motor 63 in a direction to the left, as viewed in FIGS. 2 and 12, to a selected feed speed under the action of the feed motor 62. The drum 98 is preferably located directly or nearly above the main tool holder 47 which simplifies the setting-up procedure. This drum 98 may also take additional trips which control special attachments, not shown, for the chucking automatic. The trips 135 on the right-hand control drum 100 bring about automatic changes in the r.p.m. of the main spindle 13 and in the feed speed of the main tool holder 47, and these trips also control the direction in which the main spindle rotates.

The improved chucking automatic CA is operated as follows:

Depending on the desired length of rapid axial movements performed by the main tool holder 47 under the action of the high-speed motor 63, the trips 137 on the five faces of the median drum 98 are placed in selected axial positions. Thus, and since the arm 102 and the spring 103 compel the drums 98, 99 to participate in axial movements of the main tool holder 47, and since these drums also participate in angular movements of the main tool holder, the first trip 137 on the corresponding first face of the drum 98 will actuate the cooperating first switch 138 which is located in its path when the tool holder 47 has covered a predetermined distance from its full-line position of FIGS. 2 and 12 in a direction to the left, i.e. toward the workpiece. Once the first trip 137 engages the cooperating first switch 138, the motor 63 is arrested and the feed motor 62 is started to advance the tool on the first face of the tool holder 47 into engagement with a workpiece at a speed selected by one of the potentiometer controllers 64—68. The motor 62 remains operative until a trip 140 on the first face of the drum 99 engages with the cooperating switch 141 which latter, through the limit switch 142 and through the drive 58, arrests the motor 62 and starts the motor 63 in the opposite direction so that this motor 63 thereupon rapidly returns the main tool holder to the position of FIG. 12 in which the index plate 48 trips the limit switch 142 to arrest the motor 63.

As soon as the index plate 48 trips the limit switch 142, the latter not only arrests the high-speed motor 63 but also sends an impulse to the torque motor 73 of the drive 72 for rotating the main tool holder 47. The motor 73 turns the shaft 49 through 72 degrees and is thereupon arrested by the switches 144 (shown in FIG. 12). The switch 144 thereupon sends an impulse to the high-speed motor 63 which is restarted but in the opposite direction so as to rapidly advance the main tool holder toward the workpiece to the extent determined by a second trip 137 on a second face of the drum 98 since the drum 98 is compelled to participate in angular movements of the main tool holder 47 under the action of the drive 58. The operation is then repeated in the same sequence by moving the tools on the second, third, fourth and fifth face of the main tool holder into contact with the workpiece.

The movements of the side tool holders 104, 105 independently of each other are controlled by the trips 137 on the control drum 98 and by the corresponding switches 138 which are electrically connected with the switches 133, 133a. The high speed motor 110 of the drive 106 for the tool holder 104 is started by one of the switches 138 which cooperates with one of the trips 137 on the multi-face median drum 98, and the motor 110 then drives the transmission 108 in such direction that the tool holder 104 moves toward the workpiece in the chuck 14, i.e. upwardly as viewed in FIGS. 2 and 12. The motor 110 is arrested by a switch 133 when the latter is engaged by a trip 134 mounted on the tool holder 104. This trip 134 simultaneously starts the motor 111 of the feed unit 106 so that the holder 104 is advanced at a lesser and fully controlled speed to move a given tool into contact with the workpiece. The motor 111 of the feed unit 106 is then arrested by the same switch 133 when the latter is actuated by the next trip 134, and this same switch 133 i.e. the upper switch 133, as viewed in FIG. 2 or 12, restarts the motor 110 of the feed unit 106 to return the tool holder 104 in a direction away from the workpiece. The switches 133a for the tool holder 105 are actuated by the trips 134a and are connected in the circuit of the motors 110a, 111a forming part of the feed unit 107. The operation of the trips 134a and of the switches 133a is preferably independent from the operation of trips 134 and switches 133. Thus, depending on the setting of the trips 134 and 134a, the highspeed motors 110, 110a of the feed units 106, 107 will respectively move the holders 104, 105 through a given distance toward the workpiece, whereupon the high-speed motors 110, 110a are arrested in a fully automatic way and the respective feed motors 111, 111a are started at the same time to move the tools carried by the tool holders 104, 105 into actual contact with the work. When an operation is completed, the motors 110, 110a are respectively started by the lowermost trip 134 and by the uppermost trip 134a and by the respective switches 133, 133a to rotate in opposite directions and to rapidly move the tool holders 104, 105 in a direction away from the workpiece. The high-speed motors 110, 110a are then arrested in a fully automatic way in the manner as described above. It will be seen that the movements of the tool holders 104, 105 may be at least partially coordinated with the movements performed by the main tool holder 47, i.e. that the drums which control the main tool holder may also control at least certain movements of the side tool holders. Of course, it is equally possible to operate the side tool holders independently of the main tool holder, or to fully synchronize all movements of the side tool holders with the movements of the main tool holder.

Since the transmissions 108, 108a of the feed units 106, 107 are of the variable type, the rate at which the side tool holders advanced their respective tools into actual engagement with a workpiece may be controlled within wide limits. It is preferred to utilize high-speed motors 110, 110a of the type which will move the side tool holders at a constant rate of speed.

The control panel 46 is provided with a switch 46a which serves to change from a fully automatic operation to manual push-button control, depending on the nature of the workpieces and on the nature of operation to be performed on the workpieces. Automatic operation is established by actuation of some of the knobs 46b as explained further below. However, even if the machine is operated in a fully automatic way, the operator may intervene in the automatic cycle if such intervention should prove necessary. The other various knobs 46b on the control panel 46 of the automatic CA shown in FIG. 1 serve as means for individually controlling the various drives and their component parts if the nature of a certain operaiton does not require that the main tool holder and/or the side tool holders be moved in a predetermined sequence.

An important advantage of the feature that the switches 138 which are actuatable by the trips 137 on the median control drum 98 are connected in the electric circuits of and may send operating impulses to the drives 106, 107 for the side tool holders 104, 105 is that even if the main tool holder 47 need not move its tools into actual contact with a workpiece, it nevertheless can start the drives for the side tool holders. For example, if the main tool holder 47 must run only in forward direction (i.e. to the left, as viewed in FIGS. 2 and 12), and is then arrested by a switch 138, this same switch 138 may start the side tool holder 104 and/or 105 so that the side tool holder may move a special tool, e.g. a necking attachment, into contact with the workpiece.

The following is a description of the automatic operation of the machine according to the invention, reference being had to FIGS. 12a, 12b, 12c, and 12d which taken together constitute a complete circuit diagram of the electric arrangement of the machine, showing in greater detail the various components which were only schematically illustrated in FIG. 12.

Figure 12D:
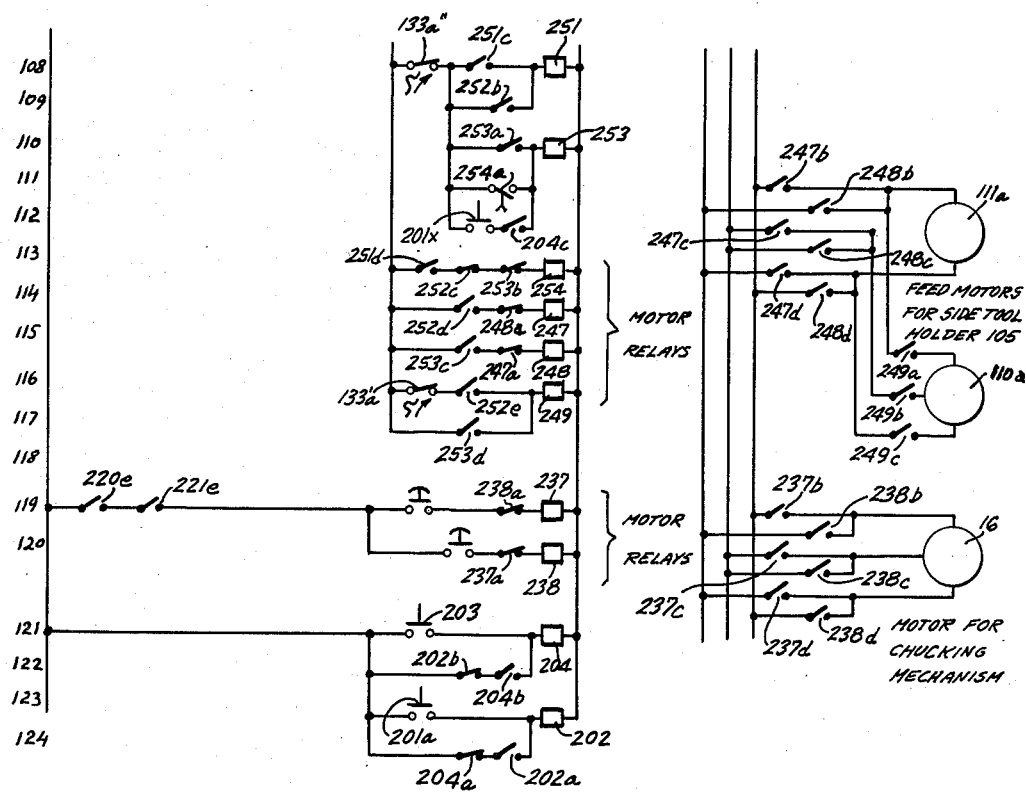

The diagram according to FIGS. 12–12d is constructed in accordance with the so-called "ladder"-system in which, generally speaking the individual "rungs" of the latter constitute different component circuits of the entire arrangement. In order to facilitate reading of the following description on the drawing a series of consecutive numbers is applied to the different "rungs" or components circuits of the entire arrangement and these reference numbers are arranged along the left-hand margin of FIGS. 12–12d. On the other hand, every one of the reference numerals or characters appearing in the following description is followed by a number in parentheses which number indicates the "rung" of the diagram where that particular component can be found.

For the sake of consistency, in the following description and in FIGS. 12a–12d, the above-mentioned push-button switch 46a is referred to as 203(121). The likewise above-mentioned knobs 46b serving to institute automatic operation are referred to here below as 201a(123), 201b (86) and 201c(48). All the remaining push-button switches are knobs 46b of FIG. 12 will be referred to as 201d–201z, respectively.

For starting operation, first of all the three-pole main switch 200 is closed so as to furnish energy into a three-phase line system 300 and to energize via a single phase transformer Zm1 which furnishes a desired lower voltage into a line system 301, 302. Most of the relays described further below are connected together with certain switches and controls between these lines 301 and 302.

For starting automatic operation of the machine first of all the push-button switch 201a(123) is actuated. Consequently, the relay coil 202 is energized and maintains itself in energized condition via the normally open relay contact 202a(124) and the normally closed relay contact 204a(124). It is to be understood, as in the just-described example that each of the relays described hereafter is composed of a relay coil carrying a certain reference numeral and a relay contact or a plurality thereof which carry the same reference numeral with the addition of a suffix character like a, b, c, etc. Since the main tool holder 47 is at this moment in its normal or starting position the normally open contact of the limit switch 142(86) is in closed position. Consequently, the actuation of the push-button switch 201b(86) serving to start the cycle of operation results in energization of the relay 206(83) via the now closed contact 202e(86). Now the motor relay 207(87) is energized via the now closed contact 206a(87) so that via the relay contacts 207a, b, c, the torque motor 73(86) is switched on for producing a rotation of the main tool holder 47. As a result, the normally closed contact $144_1(83)$ of the limit switch 144 is closed and the relay coil 206 remains energized via the closed contacts 202f(83) and 206b(84) until the next following operative position of the main tool holder 47 is reached in which case the normally closed contact $144_1(83)$ of the limit switch 144 stops a further movement of the tool holder via the relay 206 which opens the contact 206a(87) and thus de-energizes the motor relay 207(87).

During the rotation of the main tool holder 47 one contact e.g. 136a(8) of the switch 136 has been actuated by means of a correspondingly set trip e.g. 135a (FIG. 12) of the control drum 100. Consequently the relay coil 208(4) is energized via the closed contact 202k(8)

and the relay coil 208 remains energized via the pertaining normally open contact 208b(9) and the normally closed contact 209b(9) while it causes actuation of the motor relay 211 via the normally open contact 208a(2) and the normally closed contact 210d(2). The energization of the motor relay 211 causes via the contacts 211a, b, c, start of the motor 29(5) which drives the main spindle 13 at the lower one of its beads. A second trip e.g. 135d on the control drum 100 actuates another one of the contacts of the switch 136 e.g. 136d(22). Hereby the relay coil 212(20) is energized via the closed contact 202k(3) and remains in energized condition via the normally closed contacts 213b(23), 214b(23) and 215b(23). The now closed contact 212e (32) causes energization of the clutch relay 219 via the normally closed contacts 216a(32), 217a(32) and 218a(32) so that now the electric clutch 32(42) is energized via the relay contacts 219b, c (42). Another normally open contact 212f(40) causes energization of the other clutch relay 221(39) via the normally closed contacts 216b(36) and 220a(39). The clutch relay 221(39) now energizes the electromagnetic clutch 33a(45) via the normally open contacts 221b, c (45). An operating voltage of 24 volts for the electromagnetic clutches of the arrangement is furnished by a transformer Am1(44) (45) which is connected at its primary side with two phases of the supply system 300 while its secondary side is connected to a full wave rectifier An1. It can be seen that by switching on the main drive motor 29(5) and by energizing the two electromagnetic clutches 32(42) and 33a(45) a condition has been established whereby the main spindle 13 is driven at the desired speed.

During the above-described rotational movement of the main tool holder 47 another contact of the switch arrangement 136 e.g. 136i(70) is actuated. The closing of this switch serves to pre-select the desired feed velocity of the main tool holder 47. Via the now closed contact 202h(67) and the closed switch 136i(70) the relay coil 222 is energized and kept in energized condition via the normally closed contacts 223c(71), 224c(71), 225c (71), 226c(71) and the now closed, normally open contact 222c(71). The normally open contact 222a(60) now connects the sliding contact of the variable transformer 65(60, 61) with the full-wave rectifier Bn1(56) whose other input terminal is kept at the same potential as the one end of the transformer 65(60, 61). At the output terminals of the rectifier Bn1(56) a variable direct current voltage is available which serves as armature voltage for the variable speed feed motor 62(53). The exciter voltage for this motor is obtained from the already previously mentioned rectifier An1(45).

In conjunction with the above-described rotation of the main tool holder 47 also its forward feed movement is initiated. The closing of the normally open contact 206d(53) which is closed during the rotation of the tool holder 47 effects energization of the relay coil 231 via the contact chain 211e(52), 210d(53), 219d(52), 218d(53), 220d(52), 221d(53) and the now closed contact 202i(53) and the normally closed contact 232a(52). The relay coil 231(52) remains energized via the normally open contact 231b(54). The closing of the normally open contact 231c(55) causes simultaneously the energization of the relay coil 233(55) via the normally closed contact 204q(56), the normally closed contact of the limit switch 141(55) and the normally closed contact 232b(55) and the coil 233(55) remains energized via the normally open contact 233a(56). When the rotational movement of the main tool holder 47 is completed the normally open contact of the limit switch 144₃(63) is closed. Hereby the motor relay 227(63) is energized via the now closed contact 233d(63) and the normally closed 228a(63) so that now via the relay contacts 227b, c (53, 53) the feed motor 62(53) is switched on. Simultaneously the motor relay coil 229 (65) is energized via the still closed fast speed control contact 138a(65) and the now closed contact 233e(65) and the normally closed contact 230a(65). Consequently, in this manner via relay contacts 229b, c, d (48, 49, 50) the fast feed motor 63(49) is switched on. The main tool holder 47 now moves rapidly forward. As soon as the return limit switch 142(51, 57) is not acted upon any more the normally closed contact 142₁ (57) closes again whereby energization of the relay coil 232(57) is caused via the still closed switch 233b(58) and the coil 232(57) is kept in energized condition by the pertaining normally open switch 232c(57). The now open normally closed contact 232a(52) causes de-energization of the relay coil 231(52). By means of a suitably set trip 137 (FIG. 12) the fast feed motor 63(49) is switched off by the actuation of the switch 138a(65) and the resulting interruption of the circuit containing the switches 233e(65), 230a(65) and the coil 229. Now the main tool holder 47 travels further in forward direction until the forward feed limit switch 141(55) is moved to open position by a corresponding one of the trips 140 (FIG. 12) so that in this manner the energization of the relay coil 233(55) is discontinued. Since the relay coil 232(57) is still energized, the de-energization of the coil 233(55) results in closing of the normally closed contact 233c(62) and the time relay 235(62) is switched on via the normally closed contact 234b(62). After a preset period of time has elapsed the contact 235a(60) is closed and consequently causes energization of the relay coil 234(59) which is then kept energized by the pertaining normally open contact 234a(59). A normally open contact 234d(66) is now closed and causes energization of the motor relay 230(66) via the normally closed contact 229a(66). Also the motor relay coil 228(64) is energized by the normally open contact 234c(64). Consequently, the two feed motors 62(53) and 63(49) are now caused, via the relay switches 228b, c (52, 53) and 230b, c, d (49, 50, 51) to rotate in reverse direction which causes the main tool holder 47 to return rapidly towards its starting position. When it reaches the starting position the return limit switch 142₁(57) disconnects the relay coils 232(57) and 234(59) so that also the motor relay coils 228(64) and 230(66) are de-energized because the contacts 234c(64) and 234d(66) return to open position. Consequently the motors 62(53) and 63(49) have been stopped in this manner.

On account of the energization of the relay coil 234 (59) also the contact 234e(82) has been closed. Consequently the relay coil 236 was energized via the closed switch 136n(82), the actuated normally open switch contact 144₂(82) of the limit switch 144 and the closed contact 202g(81) and was kept in energized condition by the pertaining normally open contact 236a(81). Upon completion of the return of the main tool holder 47 the switch 142₂(86) of the limit switch 142 is closed. Consequently the relay coil 206(83) is energized via the closed contact 236b(84) and 202f(83). As a result of the energization of relay coil 206 the pertaining normally open contact 206a(87) closes the circuit for the motor relay 207(87) whereby via relay contacts 207a, b, c, (85, 86, 87) the torque motor 73(86) is started. As soon as the next following position of the tool holder 47 is reached the switch 144₁(83) of the limit switch 144 opens and disconnects the relay 206(83). Consequently, the contact 206a(87) opens and de-energizes the motor relay coil 207(87) whereby the torque motor 73(86) is stopped.

The above described alternating change between forward feed, return feed and rotation of the main tool holder 47 repeats until the tool holder 47 has been rotated into its last operative position. In this position one of the trips 135 (FIG. 12) actuates a contact set of the switching device 136 in such a manner that the switch 136g(51) is closed and the switch 136n(82) is opened. At first this actuation of the switches has no effect because the normally open switch 136g(51) is arranged in series with the contact 231a(51) which has been opened during the rotation procedure. The opening of the contact 136n(82) has no effect because already during the preceding rotation step the relay coil 236(81) had been de-energized due to the opening of the switch 144₂(82). However, the contact 136n(82) in its opened position prevents another rotation step from being carried out after the return run of the main tool holder 47 by the closing of the contact 234e(82). The normally open switch 136g(51) of the switch mechanism 136 is actuated and closed when the main tool holder 47 has returned to its initial position and in doing this has closed the switch 142₂(51) of the limit switch 142. The normally closed contact 231a(51) has been returned to closed position already at the start of the forward movement of the main tool holder 47. Consequently, the relay coil 217(49) is energized upon closing of the switch 142₂(51). The resulting opening of the contact 217a(32) causes interruption of current supply to the clutch relay coils 219(32) and 218(34) so that hereby the up to this moment energized clutches 32(42) or 32a(43) (see FIG. 4) are disengaged. In addition, the clutch relay coil 220(36) is energized by the closing of the normally open contact 217b(38) and similarly the clutch relay coil 221(39) is energized by the closing of the normally open contact 217c(41). Now the clutch 33(44) is energized via contact 220b+c (44) and the clutch 33a(45) is energized via contact 221b+c(45) (see also FIG. 4) and hereby the main spindle 13 is stopped or at least slowed down. Since also the contacts 220e(119) and 221e(119) are now closed the motor relay coils 237(119) and 238(120) can be energized while the spindle is stopped and consequently via the relay contacts 237b, c, d (119, 120, 121) and 238b, c, d (119, 120, 121) respectively, the motor 16 (120) for the electrical chucking operation can be energized (FIG. 3).

In order to start another cycle of operation some of the push-button switches 46b (FIG. 1) are actuated. More specifically, in this case not only the above-mentioned contact 201b(86) but also the normally closed contact 201c(48) are actuated and by the resulting de-energization of the relay coil 217(49) the stopping of the main spindle 13 is discontinued because the de-energization of relay coil 217 causes also de-energization of the clutch relay coils 220 and 221.

From the above described example of a particular selection of rotary speed and feed velocity it can be seen that by suitably setting one of the trips 135 (FIG. 12) on the control drum 100 (FIG. 12) one of the two different motor speeds and by setting another trip 135 (FIG. 12) one of the four possible clutch combinations can be preselected. Thus, for each operating position of the main tool holder 47 any one of the eight available spindle speeds can be applied automatically. In the same manner for each operative position by suitably setting another trip 135 (FIG. 12) on the control drum 100 (FIG. 12) the feed for the main tool holder 47 can be preselected. In doing this any one of the five variable transformers 64(58, 59), 65(60, 61), 66(62, 63), 67(64, 65) or 68(66, 67) can be switched on. These variable transformers are pre-adjusted in such a manner that they furnish an armature voltage for the feed motor 62(53) so selected that this motor moves the tool holder 47 with the desired feed velocity.

In order to actuate the front side tool holder 104 a trip 137 (FIG. 12) is set at an appropriate point on the control drum 98 (FIG. 12). During the forward feed of the main tool holder 47 this trip actuates the switch 138b(98). Hereby the relay coil 242(88) is energized via the closed contact 202d(89) and the normally closed 243a(88) whereafter coil 242 is kept energized by the pertaining normally open contact 242a(90). As a result the relay coil 244(91) is energized via the contact 204g(92), the forward feed limit switch contact 133₂(91) and the normally open contact 242b(91), as soon as the normally open contact 242b(91) is closed. The relay coil 244(91) remains energized via its pertaining normally open contact 244a(92). Now the motor relay coil 239(99) is energized via the normally open contact 244d(99) and the normally closed 240a(99). The motor relay coil 241(101) is energized by the closing of the normally open contact 244e(101) via the fast feed switch 133₂(101). Consequently, the feed motor 111(97) is started via the relay contacts 239b, c, d (96, 97, 98) and the fast feed motor 110(101) is similarly started via the relay contacts 241a, b, c, (100, 101, 102) so that the side tool holder 104 is moved rapidly forward. In this case, the limit switch for the return feed 133₁(93) is closed and causes thereby energization of the relay coil 243(93) via the closed contact 244b(94) whereafter the coil 243(93) is kept energized by the pertaining normally open contact 243c(93). Upon actuation of the fast feed switch 133₂(101) by a correspondingly set trip 134 (FIG. 12) this switch 133₂ is opened and consequently causes de-energization of the relay coil 241(101) and the rapid feed motor 110(101). Now the side tool carrier 104 continues to move forward. A further trip 134 (FIG. 12) set accordingly, causes opening of the feed limit switch 133₂(91) and consequently the relay 244(91) is disconnected. Due to the opening of the normally open contact 244d(99) also the motor relay coil 239(99) is de-energized and consequently stops the feed motor 111(97). By means of the now closed normally closed contact 244c(98) the time relay 246(98) is energized via the closed contact 243d(98) and the normally closed contact 245b(98). After a predetermined period of time has elapsed the contact 246a(96) is closed and thus causes energization of the relay coil 245(95) which coil then remains energized via the pertaining normally open contact 245a(95). The normally open contact 245c(100) causes energization of the motor relay coil 240(100) via the normally closed contact 239a(100). By means of another normally open contact 245d(102) the motor relay coil 241(101) is energized. Consequently, the feed motor 111(97) and the rapid feed motor 110(101) start operating in reversed direction of rotation and consequently cause a rapid return of the side tool holder 104. As soon as it reaches its initial position, the return limit switch 133₁(93) is opened whereby the relay coil 243(93) and the relay coil 245(95) are de-energized. Consequently, by the opening of the normally open contacts 245c(100) and 245d(102) the motor relay coil 240(100) and the motor relay coil 241(101), respectively are de-energized and consequently the feed motors 111(97) and 110(101) are stopped.

It will be understood that the control of the rear side tool holder 105 is entirely identical with the above-described control arrangement for the side tool holder 104. Therefore, it will not be necessary to describe in detail the operation of the relays and switches comprising or related to the relay coils 247–252 and controlling the side tool feed motors 110a and 111a. This particular group of circuit components is entirely identical with the above described one that controls the operation of the other side tool feed motors 110 and 111.

As already mentioned further above and as easily understandable to those skilled in the art, the above described automatic functions or operations of the machine and its mechanical components can also be initiated or controlled manually. By actuating the push-button 203(121) the machine is set for manual operation and the relay coil 204(121) is energized. The resulting opening of contact 204a(124) the self-holding circuit of the relay coil 202(123) is interrupted. Now the relay coil 204(121) is kept in energized condition via the pertaining normally open contact 204b(122) and the now closed normally closed contact 202b(122). Since now the relay coil 202(123) is de-energized the automatic operation of the machine is made impossible. However, by the energization of the relay coil 204(121) all the other push-button switches of the group marked 46b in FIG. 1, namely the switches 201d–201z are available for manual operation so that any desired motor speed and feed speed can be selected and initiated individually and all the rotary and longitudinal movements can be initiated and stopped individually and selectively.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. In a single-spindle chucking automatic, in combination, a multi-face main tool holder; a shaft coaxially connected with said tool holder; means supporting said shaft for axial and angular movements with said tool holder; means connected with said shaft for angularly displacing said tool holder; electromechanical drive means operatively connected with said shaft for axially reciprocating said tool holder; at least one side tool holder; carriage means for supporting said side tool holder so that the latter is movable in directions transverse to the axis of said shaft; electromechanical drive means for moving said side tool holder in said carriage means; and a control system for said first and last mentioned electromechanical drive means, said control system comprising a control rod, bearing means for supporting said control rod for axial and angular displacements and in parallelism with said shaft, means for drivingly connecting said shaft with said control rod so that the control rod participates in angular displacements of said shaft, means for connecting said control rod with said shaft so that said control rod participates in axial movements of said shaft, said last mentioned connecting means comprising resilient means connected with said control rod for permanentl y biasing said rod into an end position and means connected with said rod and adapted to be entrained by said shaft for moving the control rod from said end position against the bias of said resilient means, a plurality of control drums connected with said control rod so that each control drum participates at least in angular displacements of said control rod, trip means adjustably connected with each of said control drums, and switch means mounted in the path of said trip means and connected in the circuit of said first and last mentioned electromechanical drive means for operating said drive means in a predetermined sequence when said control rod is moved with said shaft.

2. In a single-spindle chucking automatic, in combination, a multi-face main tool holder; a shaft coaxially connected with said tool holder; bearing means supporting said shaft for axial and angular movements with said tool holder; an index plate connected with said shaft; means connected with said shaft for angularly displacing said tool holder; electromechanical drive means operatively connected with said shaft for axially reciprocating said tool holder; at least one side tool holder; carriage means for supporting said side tool holder so that the latter is movable in directions transverse to the axis of said shaft; electromechanical drive means for moving said side tool holder in said carriage means; and a control system for said first and last mentioned electromechanical drive means, said control system comprising a control rod, bearing means supporting said control rod for axial and angular displacements and in parallelism with said shaft, means for drivingly connecting said shaft with said control rod so that the control rod participates in angular displacements of said shaft, means for connecting said control rod with said shaft so that said control rod participates in axial movements of said shaft, said last mentioned connecting means comprising an arm rotatably connected with said control rod and abutting against said index plate, and resilient means for constantly biasing said control rod into abutment with said index plate, a plurality of control drums connected with said control rod so that each control drum participates at least in angular displacements of said control rod, trip means adjustably connected with each of said control drums, and switch means mounted in the path of said trip means and connected in the circuit of said first and last mentioned electromechanical drive means for operating said drive means in a predetermined sequence when said control rod is moved with said shaft.

3. In a single-spindle chucking automatic, in combination, a multi-face main tool holder; a shaft coaxially connected with said tool holder; means supporting said shaft for axial and angular movements with said tool holder; means connected with said shaft for angularly displacing said tool holder; electromechanical drive means operatively connected with said shaft for axially reciprocating said tool holder; at least one side tool holder; carriage means for supporting said side tool holder so that the latter is movable in directions transverse to the axis of said shaft; electromechanical drive means for moving said side tool holder in said carriage means; and a control system for said first and last mentioned electromechanical drive means, said control system comprising a control rod, means supporting said control rod for axial and angular displacements and in parallelism with said shaft, means for drivingly connecting said shaft with said control rod so that the control rod participates in angular displacements of said shaft, means for connecting said control rod with said shaft so that said control rod participates in axial movements of said shaft, a plurality of control drums connected with said control rod so that at least one of said drums participates in axial and angular movements of said control rod and that at least one drum participates only in angular displacements of said control rod, trip means longitudinally adjustably connected with each of said control drums, and switch means mounted in the path of said trip means and connected in the circuit of said first and last mentioned electromechanical drive means for operating said drive means in a predetermined sequence when said control rod is moved with said shaft.

4. In a single-spindle chucking automatic, in combination, a multi-face main tool holder; a shaft coaxially connected with said tool holder; means supporting said shaft for axial and angular movements with said tool holder; means operatively connected with said shaft for angularly displacing said tool holder; electromechanical drive means connected with said shaft for axially reciprocating said tool holder; at least one side tool holder; carriage means for supporting said side tool holder so that the latter is movable in directions transverse to the axis of said shaft; electromechanical drive means for moving said side tool holder in said carriage means; and a control system for said first and last mentioned electromechanical drive means, said control system comprising a control rod, means supporting said control rod for axial and angular displacements and in parallelism with said shaft, means for drivingly connecting said shaft with said control rod so that the control rod participates in angular displacements of said shaft, said connecting means comprising a chain drive including first sprocket means mounted on said control rod, second sprocket means mounted on said shaft and endless chain means mounted on said sprocket means, means for connecting said control rod with said shaft so that said control rod participates in axial movements of said shaft, a plurality of control drums connected with said control rod so that each control drum participates at least in angular displacements of said control rod, trip means adjustably connected with each of said control drums, at least one of said control drums axially shiftable on said control rod and connected with said first sprocket means, and switch means mounted in the path of said trip means and connected in the circuit of said first and last mentioned electromechanical drive means for operating said drive means in a predetermined sequence when said control rod is moved with said shaft.

5. In a single-spindle chucking automatic, in combination, a frame; a multi-face main tool holder; a shaft coaxially connected with said tool holder; means mounted in said frame for supporting said shaft for axial and angular movements with said tool holder; means connected with said shaft for angularly displacing said tool holder; electromechanical drive means operatively connected with said shaft for axially reciprocating said tool holder; an index plate connected with said tool holder; indexing guide means mounted in said frame and extending in a direction parallel with the axis of said shaft and engageable with said index plate in a plurality of angular positions of said tool holder; at least one side tool holder; carriage means mounted in said frame for supporting said side tool holder so that the latter is movable in directions transverse to the axis of said shaft; electromechanical drive means for moving said side tool holder transversely of said shaft; and a control system for said first and last mentioned electromechanical drive means, said control system comprising a control rod, means mounted in said frame for supporting said rod for axial and angular displacements and in parallelism with said shaft, means for drivingly connecting said shaft with said control rod so that the control rod participates in angular displacements of said shaft, means for connecting said control rod with said shaft so that said control rod participates in axial movements of said shaft, a plurality of control drums connected with said control rod so that each control drum participates at least in angular displacements of said control rod, trip means adjustably connected with each of said control drums, and switch means mounted in the path of said trip means and connected in the circuit of said first and last mentioned electromechanical drive means for operating said drive means in a predetermined sequence when said control rod is moved with said shaft.

6. In a single-spindle chucking automatic, in combination, a frame comprising a horizontal crosshead; a horizontal work supporting spindle mounted in said frame beneath said crosshead; a multi-face tool holder; a horizontal shaft coaxially connected with said tool holder; bearing means mounted in said frame for supporting said shaft beneath said crosshead and above said spindle for axial and angular movements with said tool holder; means operatively connected with said shaft for angularly displacing said tool holder; electromechanical drive means operatively connected with said shaft for axially reciprocating said tool holder; an index plate connected with said tool holder; horizontal indexing guide means adjustably mounted in said frame in parallelism with the axis of said shaft and adapted to engage wth said index plate in a plurality of angular positions of said tool holder; at least one side tool holder; carriage means mounted in said frame for supporting said side tool holder so that the latter is movable in a horizontal plane in directions transverse to the axis of said shaft; electromechanical drive means for moving said side tool holder in said carriage means; and a control system for said first and last mentioned electromechanical drive means, said control system comprising a horizontal control rod, means mounted in said crosshead for supporting said rod for axial and angular displacements and in parallelism with and above said shaft, means for drivingly connecting said shaft with said control rod so that the control rod participates in angular displacements of said shaft, means for connecting said control rod with said shaft so that said control rod participates in axial movements of said shaft, a plurality of control drums connected with said control rod so that each control drum participates at least in angular displacements of said control rod, trip means adjustably connected with each of said control drums, and switch means mounted in the path of said trip means and connected in the circuit of said first and last mentioned electromechanical drive means for operating said drive means in a predetermined sequence when said control rod is moved with said shaft.

7. In a single-spindle chucking automatic, in combination, a multi-face main tool holder; means for angularly displacing said tool holder; electromechanical drive means for axially reciprocating said tool holder; at least one side tool holder; electromechanical drive means for moving said side tool holder at least in a direction transverse to the axis of said main tool holder, each said electromechanical drive means comprising a high-speed motor and a feed motor; and a control system for said first and last mentioned electromechanical drive means, said control system comprising a plurality of control drums, means for connecting said control drums with said main tool holder so that one of said drums participates only in angular displacements of said main tool holder and that each other drum participates in angular and axial displacements of said main tool holder, trip means adjustably supported by each of said control drums, and switch means located in the path of said trip means and connected in the circuits of said motors for starting and arresting the motors in a predetermined sequence depending on the position of said trip means.

8. In a single-spindle chucking automatic, in combination, a multi-face main tool holder; a shaft coaxially connected with said tool holder; bearing means supporting said shaft for axial and angular movements with said tool holder; means operatively connected with said shaft for angularly displacing said tool holder; first electromechanical drive means operatively connected with said shaft for axially reciprocating said tool holder; a front and a rear side tool holder; first and second carriage means for respectively supporting said front and rear side tool holder so that the side tool holders are movable in directions transverse to the axis of said shaft; second and third electromechanical drive means for moving said front and rear side tool holder in the respective carriage means; and a control system for said first, second and third electromechanical drive means, said control system comprising a control rod, means supporting said control rod for axial and angular displacements and in parallelism with said shaft, means for drivingly connecting said shaft with said control rod so that the control rod participates in angular displacements of said shaft, means for connecting said control rod with said shaft so that said control rod participates in axial movements of said shaft, a first, a second and a third control drum each coaxially mounted on said control rod, said first and second drum having a plurality of faces equal in number to the number of faces on said main tool holder, said first and second drum connected with said control rod so that each thereof participates in axial and angular displacements of said control rod, said third drum of cylindrical contour and connected with said control rod only for angular movement therewith, trip means adjustably connected with each of said control drums, and switch means mounted in the path of said trip means and connected in the circuits of said first and last mentioned electromechanical drive means for operating said drive means in a predetermined sequence when said control rod is moved with said shaft.

References Cited by the Examiner
UNITED STATES PATENTS

| | | | |
|---|---|---|---|
| 2,029,094 | 1/36 | De Vlieg | 74—389 |
| 2,224,887 | 12/40 | Van Hamersveld | 29—64 |
| 2,592,920 | 4/52 | Lovely | 29—64 |
| 2,657,453 | 11/53 | Brodhun | 29—39 |

RICHARD H. EANES, JR., *Primary Examiner.*

WHITMORE A. WILTZ, *Examiner.*